United States Patent
Yoshida et al.

(10) Patent No.: US 11,692,378 B2
(45) Date of Patent: Jul. 4, 2023

(54) EXTERNAL HANDLE DEVICE FOR VEHICLE DOORS

(71) Applicant: KABUSHIKI KAISHA HONDA LOCK, Miyazaki (JP)

(72) Inventors: Masatoshi Yoshida, Miyazaki (JP); Kyohei Yanagita, Miyazaki (JP); Shinichi Kuroki, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 107 days.

(21) Appl. No.: 17/260,135

(22) PCT Filed: Jul. 3, 2019

(86) PCT No.: PCT/JP2019/026456
§ 371 (c)(1),
(2) Date: Jan. 13, 2021

(87) PCT Pub. No.: WO2020/031564
PCT Pub. Date: Feb. 13, 2020

(65) Prior Publication Data
US 2021/0285265 A1  Sep. 16, 2021

(30) Foreign Application Priority Data
Aug. 10, 2018 (JP) ................................. 2018-151332

(51) Int. Cl.
*E05B 85/16* (2014.01)
(52) U.S. Cl.
CPC .................... *E05B 85/16* (2013.01)
(58) Field of Classification Search
CPC .......... E05B 85/10; E05B 85/14; E05B 85/16; E05B 85/18; Y10T 292/57
See application file for complete search history.

(56) References Cited

U.S. PATENT DOCUMENTS 7,029,054 B2 *  4/2006  Kobayashi .............. E05B 79/06
                                                       296/146.1
9,193,309 B2 * 11/2015  Toyama .................. B60R 13/00
(Continued)

FOREIGN PATENT DOCUMENTS

CN   1540121 A     10/2004
CN   1676838 A   * 10/2005  ............. E05B 81/78
(Continued)

OTHER PUBLICATIONS

International Search Report (ISR) dated Sep. 3, 2019 filed in PCT/JP2019/026456.
(Continued)

*Primary Examiner* — Kristina R Fulton
*Assistant Examiner* — Noah Horowitz
(74) *Attorney, Agent, or Firm* — Rankin, Hill & Clark LLP (57) ABSTRACT

Provided is a vehicular door outer handle device including a handle body having a housing recess, a handle cover covering the handle body from the outside, a base member fixed to a vehicle door, and a support arm connected to one end in a longitudinal direction of the handle body and rotatably supported by the base member via a support shaft. A slit through which a harness connected to an electronic component housed in the housing recess is inserted is formed in the one end of the handle body and in the support arm. Although there is provided the slit that facilitates assembly work of the harness, reduction in strength is prevented while avoiding an increase in the number of parts. A handle cover 14 is integrally provided with a first reinforcing portion 55 that is fitted into a slit 51 so as to contact, or to approach and face, both side surfaces of the slit 51.

2 Claims, 8 Drawing Sheets

(56) References Cited

U.S. PATENT DOCUMENTS

| | | | |
|---|---|---|---|
| 9,249,606 B2* | 2/2016 | Naka | H01Q 1/3241 |
| 9,556,655 B2* | 1/2017 | Shimizu | E05B 81/76 |
| 10,501,966 B2* | 12/2019 | Nagata | E05B 81/56 |
| 10,982,469 B2* | 4/2021 | Frattini | G01V 3/00 |
| 2005/0006909 A1 | 1/2005 | Tanimoto et al. | |
| 2007/0046080 A1 | 3/2007 | Muneta | |
| 2014/0310916 A1 | 10/2014 | Shimizu et al. | |
| 2015/0337571 A1* | 11/2015 | Henderson | B60R 16/023 |
| | | | 292/195 |
| 2020/0123819 A1* | 4/2020 | Müller | E05B 79/06 |

FOREIGN PATENT DOCUMENTS

| | | | | |
|---|---|---|---|---|
| CN | 201560619 U | | 8/2010 | |
| DE | 102013112164 A1 * | | 5/2015 | E05B 81/78 |
| JP | 4858893 B2 | | 1/2012 | |
| JP | 5172197 B2 | | 3/2013 | |
| JP | 2015-101833 A | | 6/2015 | |
| JP | 5932708 B2 | | 6/2016 | |

OTHER PUBLICATIONS

Chinese Office Action (CNOA) dated Jun. 21, 2021 for the corresponding Chinese Patent Application No. 201980044202.7 and its English translation.

* cited by examiner

EXTERNAL HANDLE DEVICE FOR VEHICLE DOORS

TECHNICAL FIELD

This application claims priority based on Japanese Patent Application "No. 2018-151332" filed on Aug. 10, 2018 and incorporates its contents by reference.

The present invention relates to a vehicular door outer handle device including: a handle body that has a housing recess for housing an electronic component and is formed in a substantially U-shaped cross-section open at a side opposite to an outer panel of a vehicle door; a handle cover that covers the handle body from the outside so as to constitute an operating handle disposed on an outer surface side of the vehicle door together with the handle body; a base member fixed to the vehicle door; and a support arm that is connected to one end in a longitudinal direction of the handle body, to be inserted into the outer panel, and is rotatably supported by the base member via a support shaft, in which a slit through which a harness connected to the electronic component housed in the housing recess is inserted is formed in the one end of the handle body and in the support arm.

BACKGROUND ART

In the vehicular door outer handle device known in PATENT LITERATURE 1, the slit through which the harness connected to the electronic component housed in the housing recess of the handle body is easily inserted is provided in the handle body and the support arm.

CITATION LIST

Patent Literature

PATENT LITERATURE 1: Japanese Patent No. 5172197

SUMMARY OF INVENTION

Problems to be Solved by Invention

By the way, by inserting the harness through the slit, assembling workability of the harness is remarkably improved, however, reduction in strength of the handle body and the support arm is inevitable at a portion where the slit is provided. For example, this portion is vulnerable to an action of a load from above on the operating handle when a person leans against the operating handle attached to the vehicle door. Further, the strength is required at a sliding contact portion of the support arm with the base member. In the handle device disclosed in PATENT LITERATURE 1, a spacer as a holding member of the harness inserted through the slit is inserted into the slit. It is presumed that the spacer functions to reinforce the portion where the slit is provided. However, the spacer is a member different from the handle body and the support arm, which causes an increase in the number of parts.

The present invention has been made in view of such circumstances. An object of the present invention is to provide the following vehicular door outer handle device. Although this outer handle device has the slit that facilitates the assembly work of the harness, it is possible to prevent the reduction in the strength while avoiding the increase in the number of parts.

Solution to Problems

In order to achieve the object described above, the first feature of the present invention is a vehicular door outer handle device including: a handle body that has a housing recess for housing an electronic component and is formed in a substantially U-shaped cross-section open at a side opposite to an outer panel of a vehicle door, a handle cover that covers the handle body from the outside so as to constitute an operating handle disposed on an outer surface side of the vehicle door together with the handle body, a base member fixed to the vehicle door, and a support arm that is connected to one end in a longitudinal direction of the handle body, to be inserted into the outer panel, and is rotatably supported by the base member via a support shaft. In the vehicular door outer handle device in which a slit through which a harness connected to the electronic component housed in the housing recess is inserted is formed in the one end of the handle body and in the support arm, the handle cover is integrally provided with a first reinforcing portion that is fitted into the slit so as to contact, or to approach and face, both side surfaces of the slit.

Further, in addition to the configuration of the first feature, the second feature of the present invention is that the base member is integrally provided with a second reinforcing portion that is fitted into the slit so as to contact, or to approach and face, the both side surfaces of the slit Moreover, in addition to the configuration of the first or second feature, the third feature of the present invention is that the first reinforcing portion is integrally provided on the handle cover so that the harness can be pushed in the slit so as to be positioned at a regular position.

Note that a first base member 18 of an embodiment corresponds to the base member of the present invention. An electronic component integrated unit 38 of the embodiment corresponds to the electronic component of the present invention.

Effects of Invention

According to a first feature of the present invention, the first reinforcing portion integrally provided on the handle cover is fitted into the slit so as to contact, or to approach and face, the both side surfaces of the slit. Therefore, it is possible to prevent the reduction in the strength of the handle body and the support arm at the portion where the slit for improving the assembling workability of the harness is provided, while avoiding the increase in the number of parts.

According to a second feature of the present invention, the second reinforcing portion integrally provided on the base member is fitted into the slit so as to contact, or to approach and face, the both side surfaces of the slit. Therefore, it is possible to more reliably prevent the reduction in the strength of the handle body and the support arm at the portion where the slit is provided.

Further, according to a third feature of the present invention, the harness can be pushed in the slit by the first reinforcing portion so as to be positioned at a regular position. Therefore, it is possible to prevent the harness from being caught between the handle body and the support arm, and the first reinforcing portion.

DESCRIPTION OF EMBODIMENTS

Hereinafter, an embodiment of the present invention will be described with reference to FIGS. 1 to 8 attached. First, in FIGS. 1 to 3, for example, an operating handle 12 extending in a front-rear direction (left-right direction of FIGS. 1 and 2) of a vehicle is rotatably attached to an outer panel 11 of a vehicle door D that is a side door. The operating handle 12 includes a handle body 13 and a handle cover 14 made of synthetic resin. The handle body 13 is made of hard synthetic resin, extends in the front-rear direction of the vehicle, and is disposed on an outer surface side of the outer panel 11. The handle cover 14 covers an outside of the handle body 13.

The handle body 13 has a substantially U-shaped cross-sectional shape open at a side opposite to the outer panel 11, and extends in the front-rear direction of the vehicle. A substantially L-shaped support arm 15 that is inserted into the outer panel 11 is integrally provided at one end in a longitudinal direction of the handle body 13, or a front end (right end of FIGS. 1 and 2) in this embodiment. A connecting arm 16 that is inserted into the outer panel 11 is integrally provided at the other end of the handle body 13, or at a rear end in this embodiment.

The outer panel 11 is provided with a curved portion 11a forming a recess 17 so as to bulge inward in a vehicle width direction. The recess 17 is disposed between the support arm 15 and the connecting arm 16 so that a vehicle user's hand griping the operating handle 12 can be inserted therein.

A first base member 18 and a second base member 19 are fixed to the vehicle door D at positions where the recess 17 is sandwiched between them in the front-rear direction of the vehicle. A thin plate-like first sheet member 20 is interposed between the first base member 18 and the outer surface of the outer panel 11. A thin plate-like second sheet member 21 is interposed between the second base member 19 and the outer surface of the outer panel 11.

Figure 4:
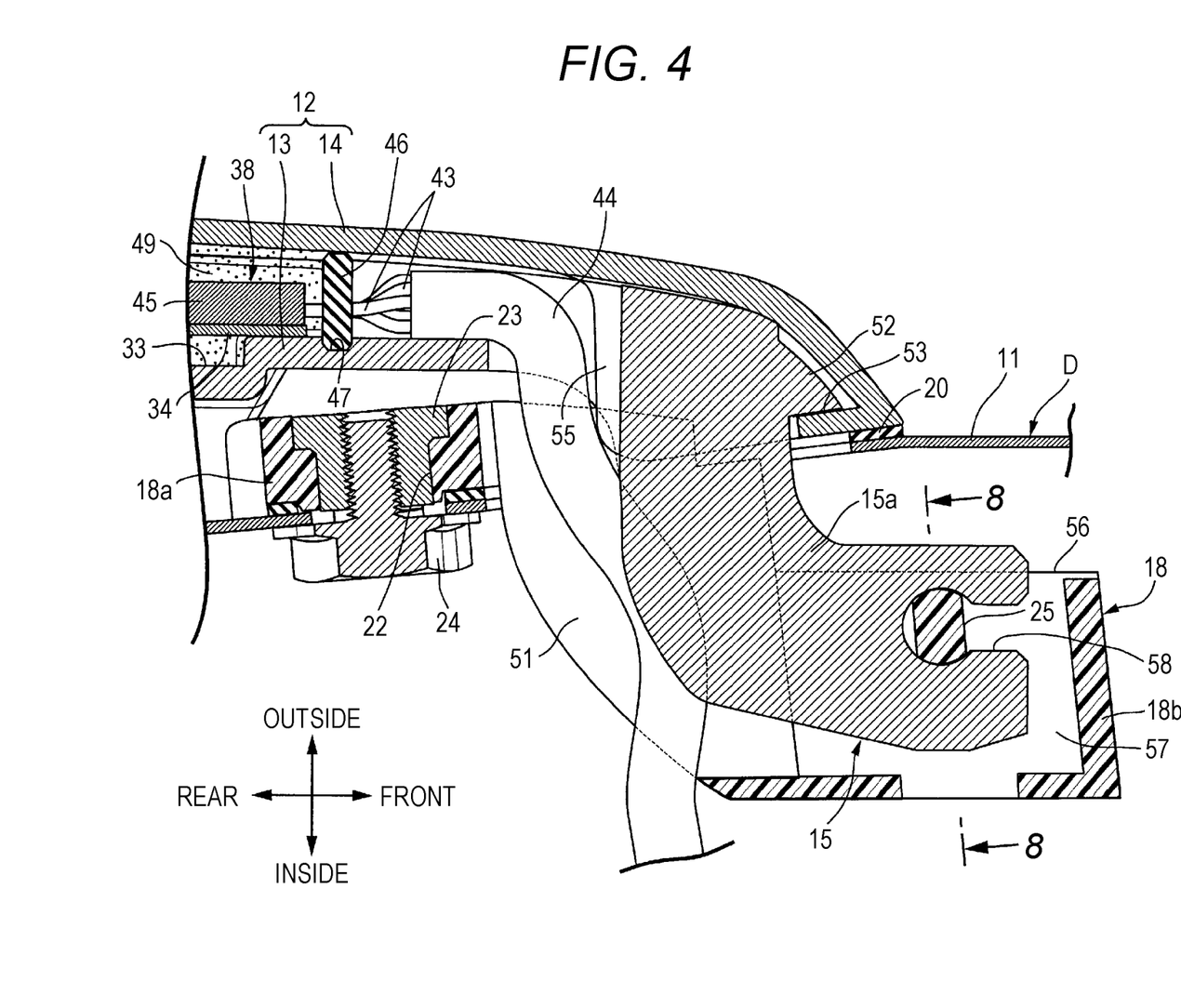
FIG. 4 is an enlarged cross-sectional view taken along a line 4-4 of FIG. 1.
Figure 5:
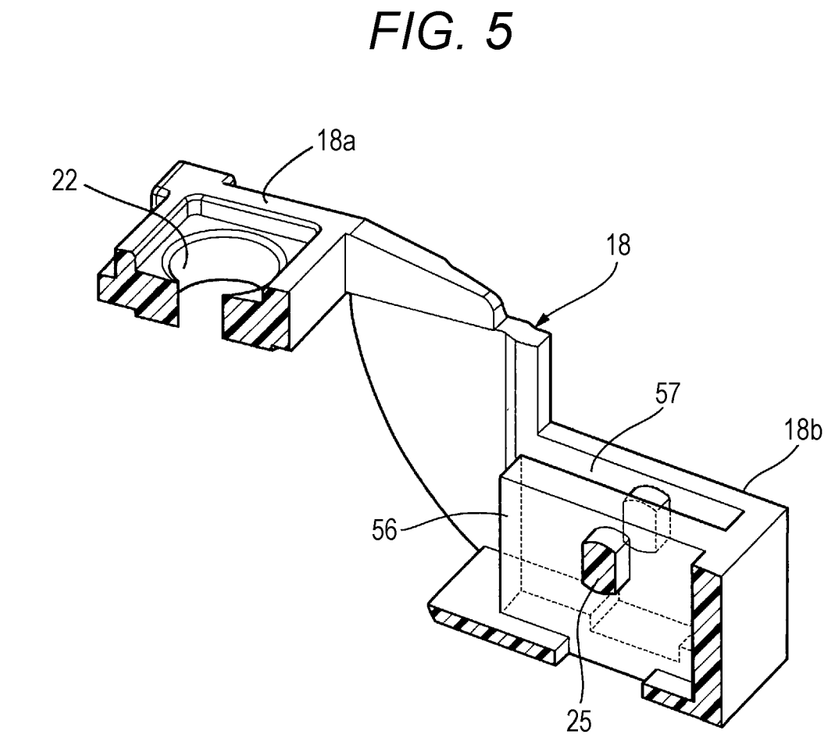
FIG. 5 is a vertical cross-sectional perspective view of a base member.

With reference to FIGS. 4 and 5, the first base member 18 is disposed in front of the recess 17 in the front-rear direction of the vehicle. The first base member 18 integrally has an attached portion 18a and a substantially L-shaped handle support portion 18b. The attached portion 18a is disposed outside the outer panel 11 so as to sandwich the first seat member 20 between the attached portion 18a and the outer surface of the outer panel 11. The substantially L-shaped handle support portion 18b is integrally connected to the attached portion 18a and is inserted inside the outer panel 11. A fitting hole 22 is formed in the attached portion 18a. The first base member 18 is fixed to the outer panel 11 of the vehicle door D by a first nut 23, that is engaged with the attached portion 18a from the side opposite to the outer panel 11, being fitted into the fitting hole 22, and by a first bolt 24, that is inserted into the outer panel 11, being screwed into the first nut 23. Further, the handle support portion 18b is integrally provided with a support shaft 25. A tip portion of the support arm 15 is rotatably supported by the support shaft 25.

Figure 1:
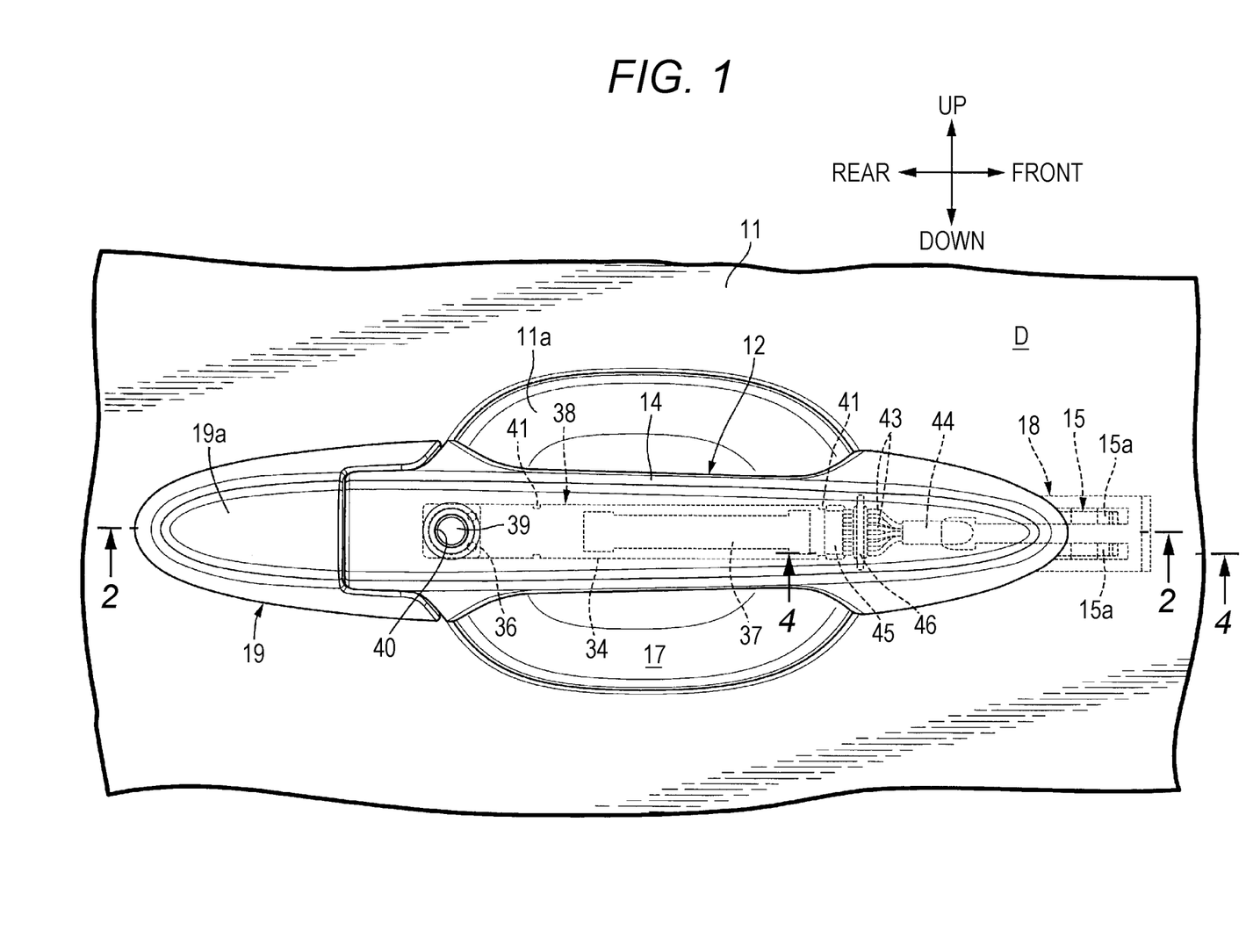
FIG. 1 is a partial side view of a vehicle door.
Figure 2:
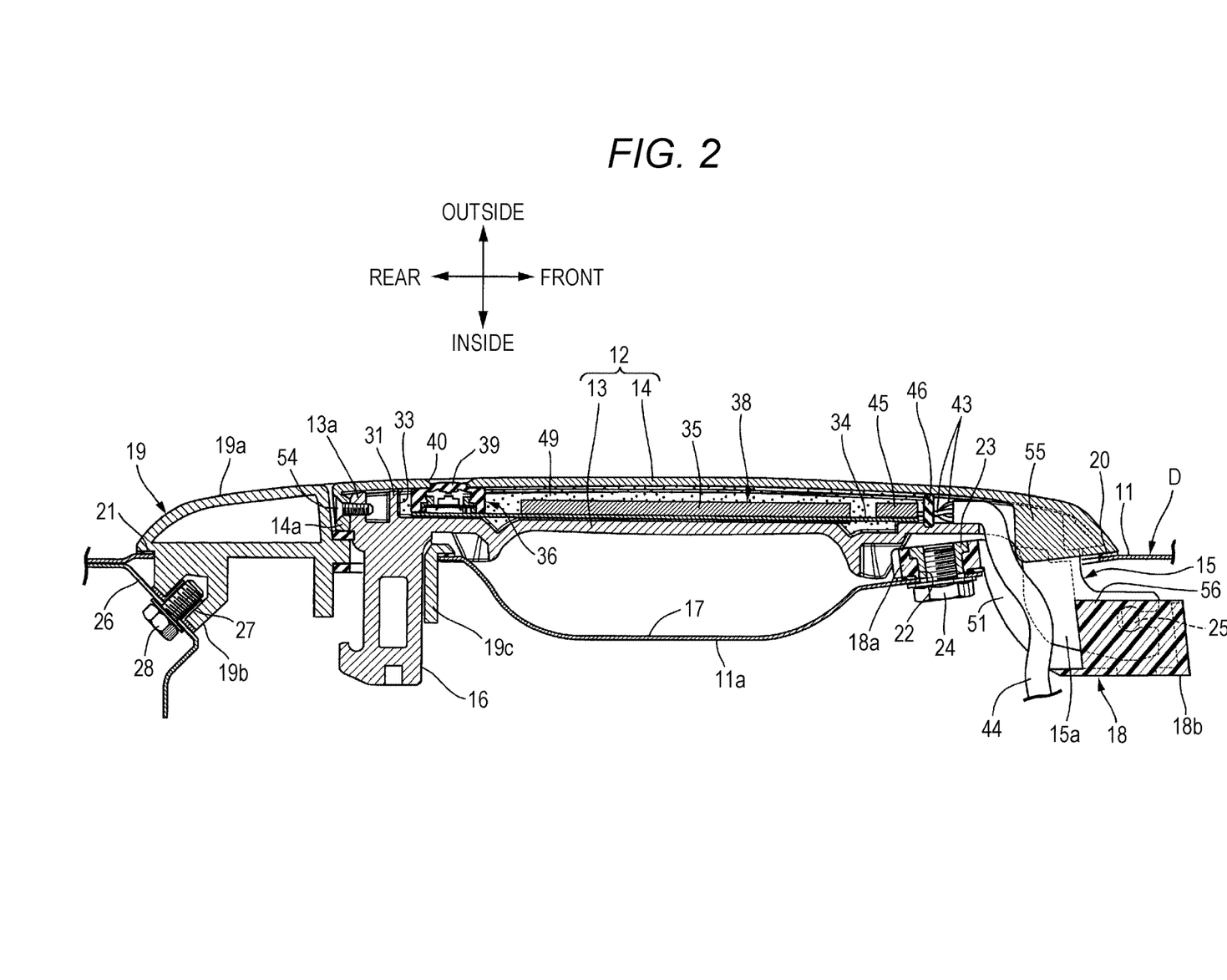
FIG. 2 is a cross-sectional view taken along a line 2-2 of FIG. 1.
Figure 3:
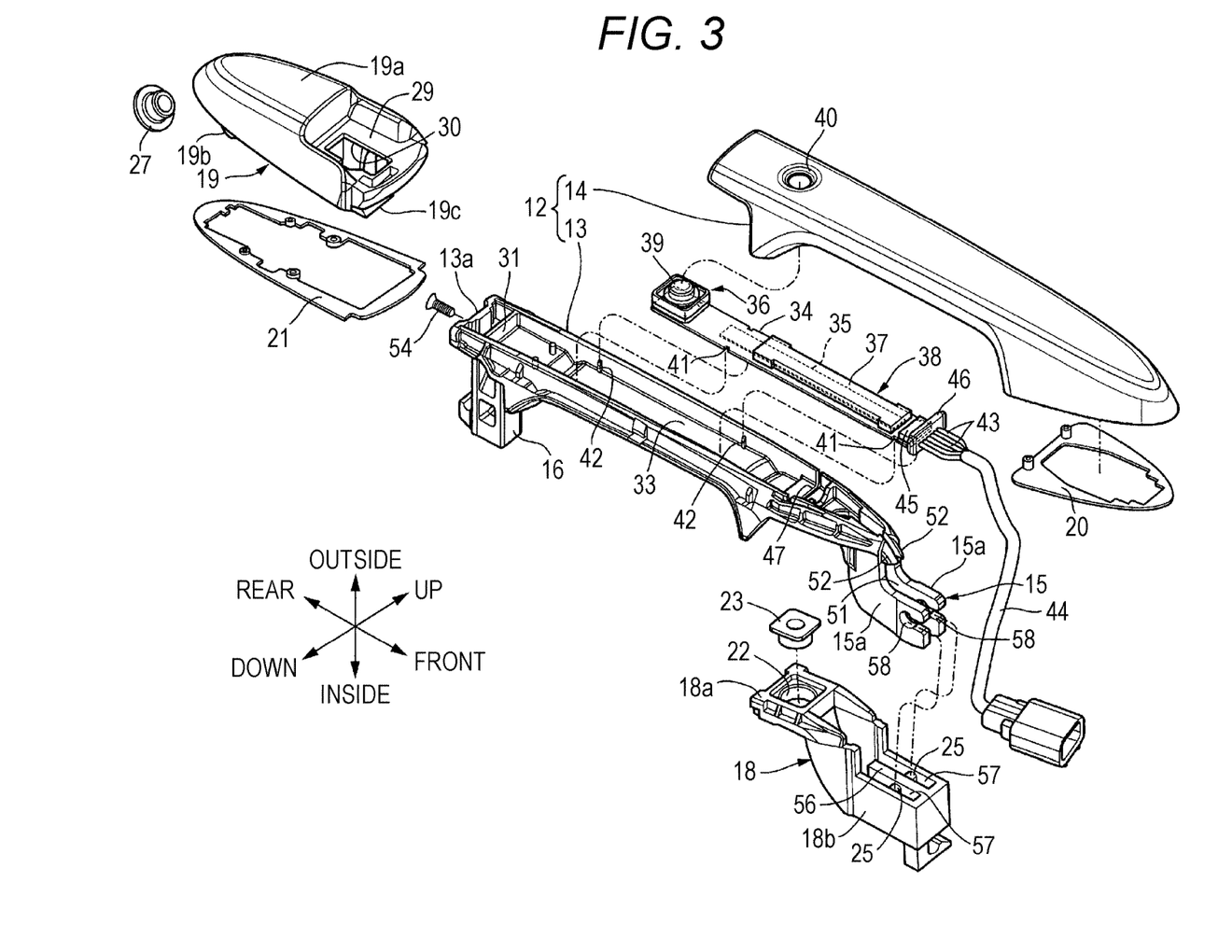
FIG. 3 is an exploded perspective view of an outer handle device.

Focusing on FIGS. 2 and 3, the second base member 19 is disposed behind the recess 17 in the front-rear direction of the vehicle. The second base member 19 has a base member main portion 19a, an attached portion 19b, and a guide portion 19c. The base member main portion 19a is disposed outside the outer panel 11 so as to sandwich the second seat member 21 between the base member main portion 19a and the outer surface of the outer panel 11. The attached portion 19b and the guide portion 19c are integrally connected to the base member main portion 19a and extend inside the outer panel 11.

An end wall 26 forming a rear end portion of the vehicle door D in the front-rear direction of the vehicle is coupled to the outer panel 11. A second nut 27 is press-fitted from the end wall 26 side into a tip portion of the attached portion 19b facing the end wall 26. By screwing and tightening a second bolt 28, that is inserted through the end wall 26, into the second nut 27, the second base member 19 is fixed to the end wall 26 of the vehicle door D.

A recess 29 is formed in a front half of the base member main portion 19a in the front-rear direction of the vehicle. The recess 29 receives another end, that is, a rear end of the operating handle 12, in a non-operation state of the operating handle 12. An outer surface of the base member main portion 19a is formed to be smoothly continuous to an outer surface of the handle cover 14 of the operating handle 12 in a state where the rear end of the operating handle 12 is received in the recess 29.

An insertion hole 30 for inserting the connecting arm 16 is formed in the recess 29. The guide portion 19c is integrally connected to the base member main portion 19a so as to guide the connecting arm 16 inserted into the insertion hole 30.

The connecting arm 16 is connected to a latch mechanism (not shown). By operating the operating handle 12 when the vehicle door D is in an unlocked state, the latch mechanism releases a closed state of the vehicle door D, and the vehicle door D can be opened by operating the operating handle 12.

A partition wall 31 is integrally provided on the handle body 13. The partition wall 31 is disposed at a position spaced forward from a rear end wall 13a of the handle body 13 in the front-rear direction of the vehicle. In front of the partition wall 31, a housing recess 33 opened to the handle cover 14 side is formed in the handle body 13.

An electronic component is housed in the housing recess 33. In this embodiment, the electronic component integrated unit 38 as the electronic component is housed in the housing recess 33. In the electronic component integrated unit 38, a touch sensor 35 for detecting that the vehicle user touches the operating handle 12 is provided on a back surface side of a substrate 34, and a detection circuit (not shown), a tact switch 36 and an antenna 37 are provided on a front surface side of the substrate 34.

The tact switch 36 confirms a locking intention of the vehicle user in response to the vehicle user pressing a switch button 39. The handle cover 14 is provided with an opening 40 for exposing the switch button 39.

Positioning recesses 41 are respectively formed at two locations spaced apart from each other in the front-rear direction of the vehicle on both side surfaces of the substrate 34. Further, positioning protrusions 42 protruding from upper and lower side surfaces of the housing recess 34 are integrally provided projecting from the handle body 13. By respectively fitting the positioning protrusions 42 into the positioning recesses 41, a position of the electronic component integrated unit 38 in the housing recess 33 is determined.

A connector 45 for connecting a plurality of conductive wires 43 is attached to an end portion of the substrate 34 on a side opposite to the partition wall 31. The conducting wire 43 is inserted through a rubber grommet 46. The grommet 46 is attached to the handle body 13 at a position spaced forward from the connector 45 in the front-rear direction of the vehicle. In order to attach the grommet 46 to the handle body 13, an attachment groove 47 is formed on an inner surface of the handle body 13. Upper and lower side edges and an inner edge in the vehicle width direction of the grommet 46 are fitted into the attachment groove 47, so that the grommet 46 is attached to the handle body 13.

The housing recess 33 is formed between the partition wall 31 and the grommet 46 in the handle body 13. With the electronic component integrated unit 38 positioned in the housing recess 33, the housing recess 33 is filled with a potting agent 49 in order to bury the electronic component integrated unit 38.

With respect to the grommet 46, the conductive wires 43 are bundled as a harness 44 on a side opposite to the housing recess 33. The harness 44 is led out to the outside from one end (the front end in this embodiment) of the handle body 13 and a slit 51 provided in the support arm 5. The slit 51 is formed in a central portion in a width direction of the support arm 15. By forming the slit 51, the support arm 15 has a shape including a pair of split arm portions 15a and 15a arranged on both sides of the slit 51.

Figure 6:
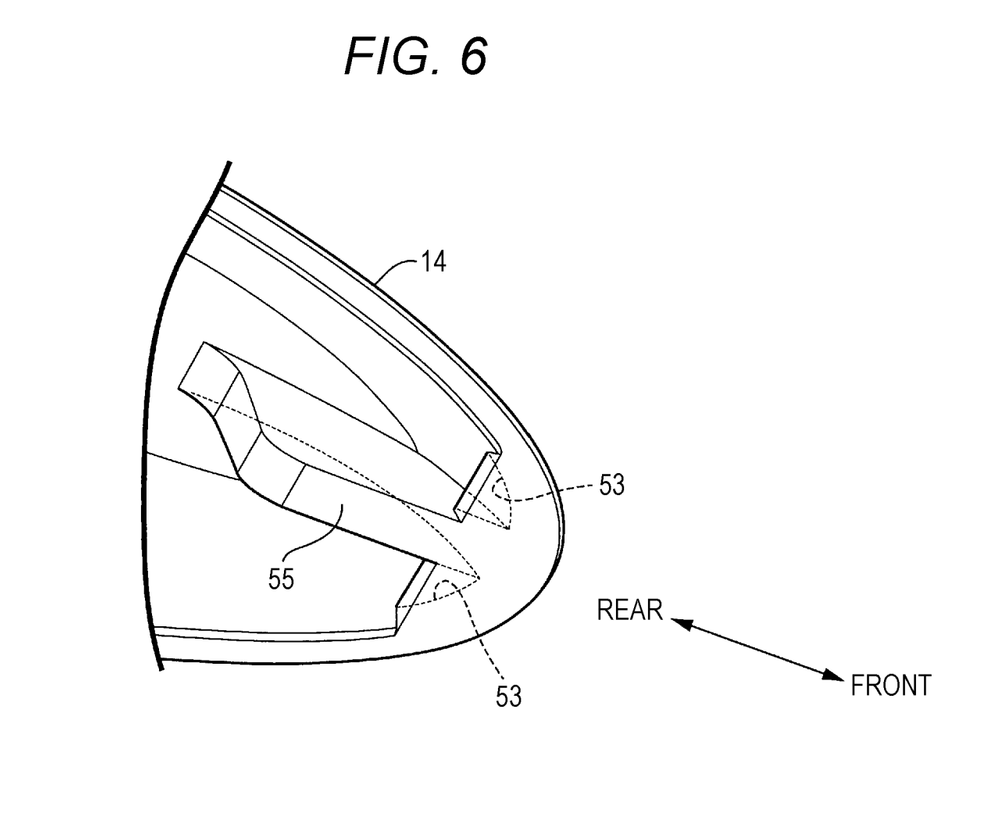
FIG. 6 is a perspective view of one end of a handle cover as seen from a handle body side.

By the way, the handle cover 14 is fastened to the handle body 13 so as to cover the handle body 13 from the outside. At the front end of the handle body 13, a pair of engaging protrusions 52 projecting forward in the front-rear direction of the vehicle is provided so as to be arranged on the both sides of the slit 51. On the other hand, as shown in FIG. 6, a locking recess 53 with which the engaging protrusion 52 is engaged is formed to be opened rearward in the front-rear direction of the vehicle in the handle cover 14. Further, as clearly illustrated in FIG. 2, the handle cover 14 has a rear end wall 14a facing the rear end wall 13a of the handle body 13 from the rear. The rear end wall 14a of the handle cover 14 is fastened to the rear end wall 13a of the handle body 13 by a screw member 54.

The handle cover 14 is integrally provided with a first reinforcing portion 55 that is fitted into the slit 51 so as to contact, or to approach and face, the both side surfaces of the slit 51. In this embodiment, the first reinforcing portion 55 provided at a front end of the handle cover 14 so as to be disposed between a pair of the locking recesses 53 is fitted into the slit 51.

Figure 7:
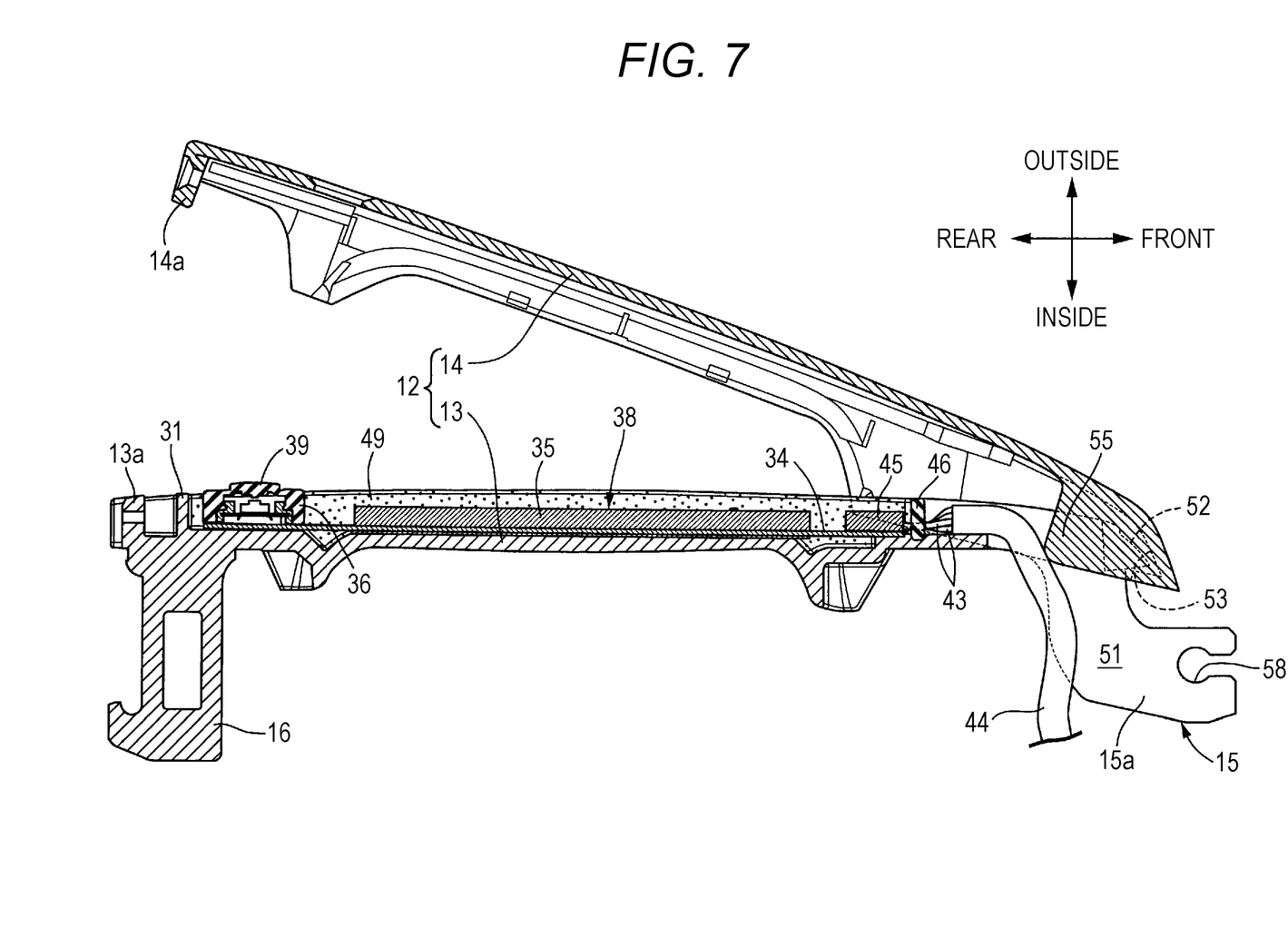
FIG. 7 is a vertical cross-sectional view illustrating a state of the handle cover when assembled to the handle body.

Moreover, as illustrated in FIG. 7, in a state where the engaging protrusions 52 at the front end of the handle body 13 is engaged with the locking recesses 53 at the front end of the handle cover 14, when the rear end of the handle cover 14 is rotated so as to approach the rear end of the handle body 13 in order to fasten the handle cover 14 to the main body 13, the first reinforcing portion 55 pushes the harness 44 in the slit 51 so that the harness 44 is positioned at a regular position.

Figure 8:
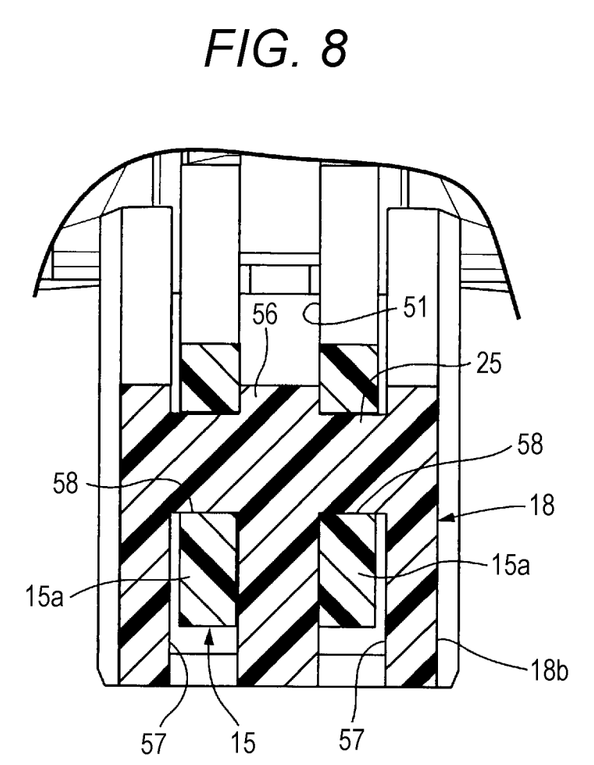
FIG. 8 is a cross-sectional view taken along a line 8-8 of FIG. 4.

With reference to FIG. 8, the first base member 18 is integrally provided with a second reinforcing portion 56. The second reinforcing portion 56 is fitted into the slit 51 so as to contact, or to approach and face, the both side surfaces of the slit 51. The second reinforcing portion 56 is provided in a flat plate shape on the handle support portion 18b of the first base member 18 so that a pair of insertion recesses 57 is formed on both sides thereof. Front ends of the pair of split arm portions 15 constituting the support arm 15 are respectively inserted into the pair of insertion recesses 57. The support shaft 25 is integrally provided on the handle support portion 18b so as to straddle the insertion recesses 57. Fitting recesses 58 into which the support shaft 25 is fitted are respectively formed at the front ends of the split arm portions 15a of the support arm 15.

Next, an operation of this embodiment will be described. The slit 51 through which the harness 44 connected to the electronic component integrated unit 38 housed in the housing recess 33 in the handle body 13 is inserted is formed in one end (the front end in this embodiment) of the handle cover 14 constituting the operating handle 12 together with the handle body 13 and in the support arm 15. The support arm 15 is connected to the front end of the handle body 13 so as to be rotatably supported by the first base member 18 fixed to the vehicle door D via the support shaft 25. The handle cover 14 is integrally provided with the first reinforcing portion 55 that is fitted into the slit 51 so as to contact, or to approach and face, the both side surfaces of the slit 51. Therefore, it is possible to prevent reduction in strength of the handle body 13 and the support arm 15 at a portion where the slit 51 for improving assembling workability of the harness 44 is provided, while avoiding an increase in the number of parts.

Moreover, the first reinforcing portion 55 is integrally provided on the handle cover 14 so that the harness 44 can be pushed in the slit 51 so as to be positioned at the regular position. Therefore, the harness 44 can be pushed in the slit 51 by the first reinforcing portion 55 so as to be positioned at the regular position. Therefore, it is possible to prevent the harness 44 from being caught between the handle body 13 and the support arm 15, and the first reinforcing portion 55.

Further, the first base member 18 is integrally provided with the second reinforcing portion 56 that is fitted into the slit 51 so as to contact, or to approach and face, the both side surfaces of the slit 51. Therefore, it is possible to more reliably prevent the reduction in the strength of the handle body 13 and the support arm 15 at the portion where the slit 51 is provided.

The embodiment of the present invention has been described above. However, the present invention is not limited to the above embodiment. It is possible to make various design changes without departing from the present invention described in claims.

LIST OF REFERENCE NUMERALS

11: outer panel, 12: operating handle, 13: handle body, 14: handle cover, 15: support arm, 18: base member, 25: support shaft, 33: housing recess, 38: electronic component integrated unit that is electronic component, 44: harness, 51: slit, 55: first reinforcing portion, 56: second reinforcing portion, D: vehicle door.

The invention claimed is:
1. A vehicular door outer handle device comprising:
a handle body (13) that has a housing recess (33) for housing an electronic component (38) and is formed in a substantially U-shaped cross-section open at a side opposite to an outer panel (11) of a vehicle door (D);
a handle cover (14) that covers the handle body (13) from the outside so as to constitute an operating handle (12) disposed on an outer surface side of the vehicle door (D) together with the handle body (13);
a base member (18) fixed to the vehicle door (D); and
a support arm (15) that is connected to one end in a longitudinal direction of the handle body (13), to be inserted into the outer panel (11), and is rotatably supported by the base member (18) via a support shaft (25), wherein in the vehicular door outer handle device in which a slit (51) through which a harness (44) connected to the electronic component (38) housed in the housing recess (33) is inserted is formed in the one end of the handle body (13) and in the support arm (15), the handle cover (14) is integrally provided with a first reinforcing portion (55) that is fitted into the slit (51) so as to contact, or to approach and face, both side surfaces of the slit (51), and the first reinforcing portion (55) is integrally provided on the handle cover (14) so that the first reinforcing portion (55) pushes the harness (44) in the slit (51) so that the harness (44) is positioned at a regular position.

2. The vehicular door outer handle device according to claim 1, wherein the base member (18) is integrally provided with a second reinforcing portion (56) that is fitted into the slit (51) so as to contact, or to approach and face, the both side surfaces of the slit (51).

\* \* \* \* \*